United States Patent [19]

Daigle, Sr. et al.

[11] Patent Number: 4,696,602
[45] Date of Patent: Sep. 29, 1987

[54] APPARATUS AND SYSTEM FOR FLOODING SUBMERGED STRUCTURES

[75] Inventors: Richard A. Daigle, Sr., Thibodaux, La.; William G. Stanfield; Michael E. Crenshaw, both of Dallas, Tex.

[73] Assignee: LTV Energy Products Company, Dallas, Tex.

[21] Appl. No.: 844,711

[22] Filed: Mar. 27, 1986

[51] Int. Cl.⁴ .................... E02B 17/02; E02D 21/00; E02D 23/02
[52] U.S. Cl. ................................. 405/205; 405/195; 405/203
[58] Field of Search ............... 405/195, 205, 207, 208, 405/203, 200, 188, 224, 225; 114/125, 265; 74/501 C; 251/294

[56] References Cited

U.S. PATENT DOCUMENTS

| | | | |
|---|---|---|---|
| 3,815,372 | 6/1974 | Mott | 405/208 |
| 3,927,860 | 12/1975 | Smith et al. | 251/294 |
| 4,034,622 | 7/1977 | Deck | 251/294 |
| 4,094,334 | 6/1978 | Taylor | 251/294 |
| 4,240,767 | 12/1980 | Gracia | 405/225 |
| 4,412,759 | 11/1983 | Britton et al. | 405/225 |
| 4,474,509 | 10/1984 | Antes et al. | 405/195 |
| 4,516,441 | 5/1985 | Paynter | 74/501 C |

FOREIGN PATENT DOCUMENTS

| | | | |
|---|---|---|---|
| 947997 | 1/1964 | United Kingdom | 74/501 C |
| 1299438 | 12/1972 | United Kingdom | 74/501 C |

Primary Examiner—Cornelius J. Husar
Assistant Examiner—Nancy J. Stodola
Attorney, Agent, or Firm—Arnold, White & Durkee

[57] ABSTRACT

Disclosed is a flooding system for uprighting and setting marine structures into and above bodies of water. The structures include a surface platform and at least one hollow support leg. Each leg includes at least one port that when closed will seal the leg. The system includes a valve attached to each port. The valve serves as a closure that regulates the flow of water from the body of water through the port to flood the structure. An operator is coupled to each valve by a low friction remote control cable. The operator is located above the surface of the body of water and usually attached to the platform. The cable translates the relative motion of the operator to open and close the valve. The cable comprises a flexible member encased in a flexible casing. The flexible member is isolated from the casing by a bearing means that allows the member to move axially within the casing to translate the motion of the operation to control the valve.

6 Claims, 6 Drawing Figures

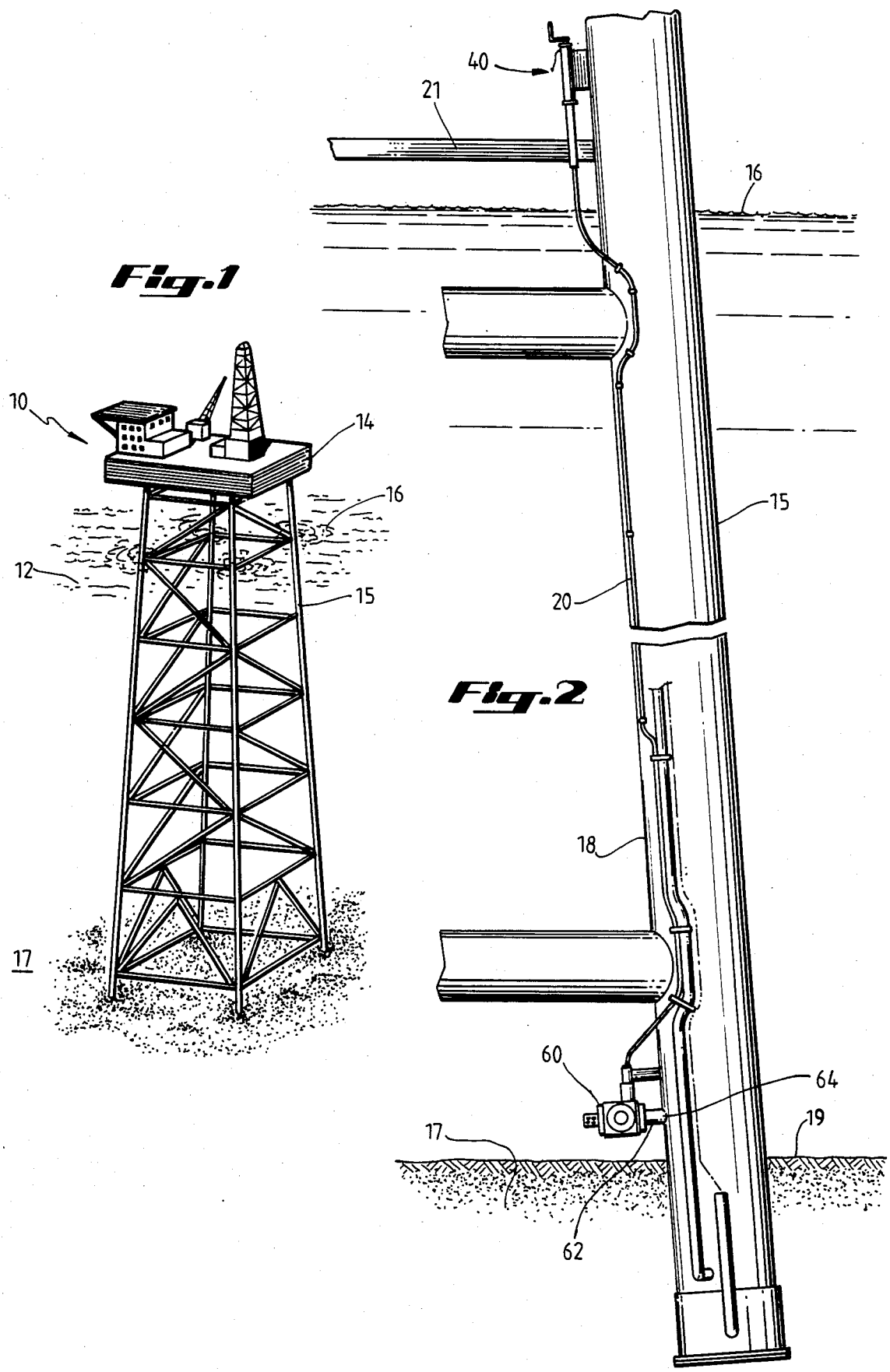

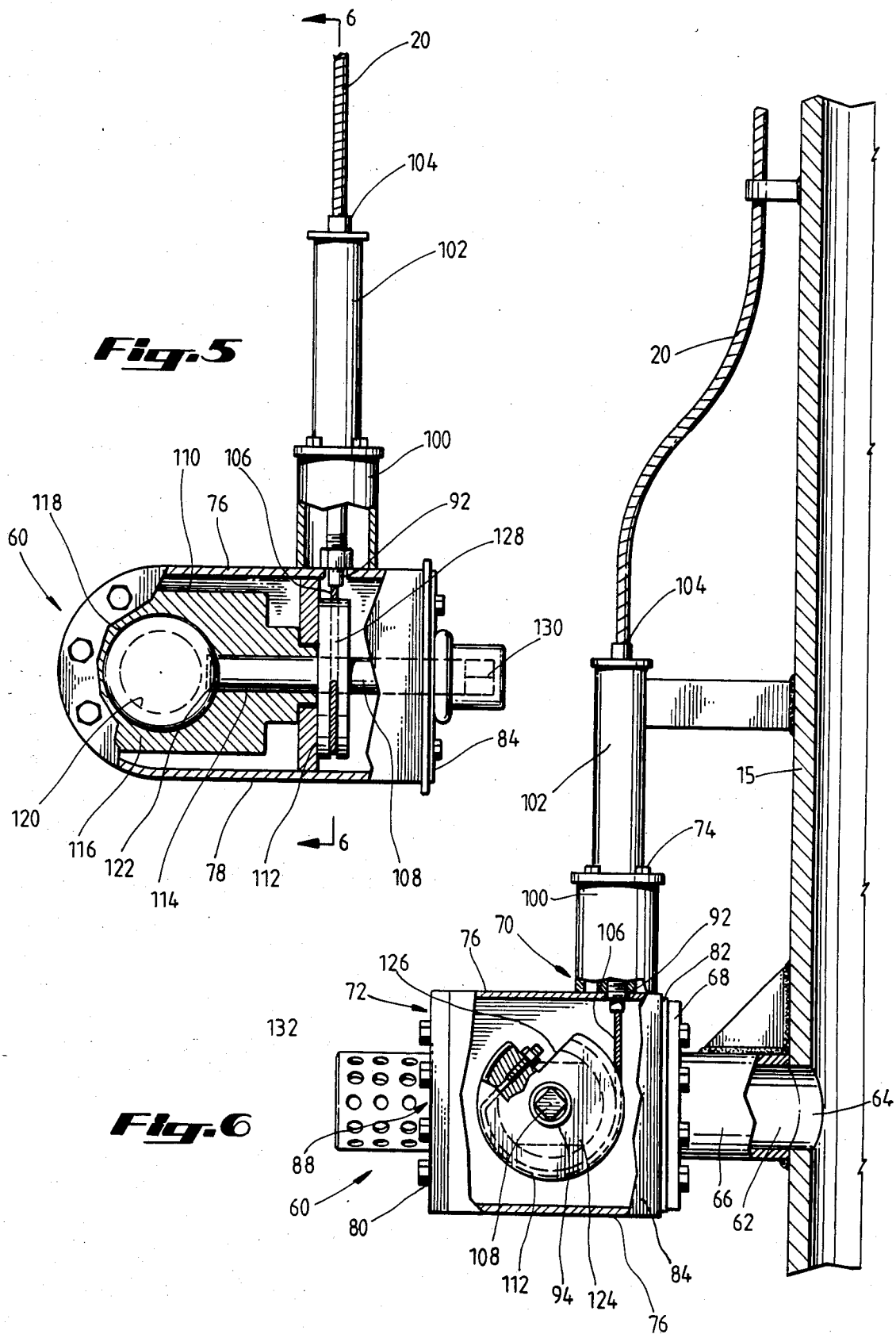

4,696,602

APPARATUS AND SYSTEM FOR FLOODING SUBMERGED STRUCTURES

FIELD OF THE INVENTION

The present invention relates generally to a system for uprighting and setting sealed marine structures into and above bodies of water. More particularly, the invention relates to a system for controlling the flooding of the sealed legs and compartments of such structures in order to maintain buoyancy for proper uprighting and setting.

BACKGROUND OF THE INVENTION

Today there is a great need for stationary marine structures located in and above bodies of water. Examples of such structures include offshore platforms, boat ports, oil wells and mining rigs. Many are essentially man-made islands.

Many of the marine structures are sealed for buoyancy prior to launching into the body of water. Although sealed, controlled flooding of the structures is usually required to properly upright and set the structures. Conventional methods of controlling the flooding include reach rod systems and hydraulic systems.

Reach rod systems include a series of interconnected, jointed rod segments, a valve, and an actuator lever. The valve is attached to the marine structure below the water line. The valve controls the flow of water into the sealed structure. The rod segments are attached to the valve and extend to a point above the water level. There, a rod segment is attached to a lever or handle. By rotating the lever or handle the valve is actuated.

Reach rod systems, while jointed are essentially rigid, and proper alignment during construction is critical. Proper alignment is especially critical where the rod segments must be arranged to avoid braces, anodes and other obstructions disposed between the valve and the lever. Even though properly aligned, reach rods sometimes bind leaving the system inefficient or useless. Also, reach rod systems are limited in length because the gravitational forces on the heavy rods also can cause binding.

Hydraulic systems for flooding marine structures include a valve connected to a hydraulic pump. Like the reach rod system, the valve is attached to the structure below the water level. The hydraulic pump and its controls are ordinarily located above the water level on the work deck. A fluid line couples the pump with the valve actuator and serves to communicate hydrualic fluid to operate the valve.

In most cases, well trained technicians are required to install, test and operate the hydraulic systems. Furthermore, hydrualic systems provide no direct indication to the operator of valve position without additional instrumentation.

The above recited problems associated with reach rod systems and hydraulic systems are not intended to be exhaustive; instead, they are enumerated for the purpose of demonstrating the need for a better system for use in flooding submersible marine structures.

SUMMARY OF THE INVENTION

The present invention addresses and overcomes problems encountered by both the hydraulic and reach rod systems for flooding submersible marine structures. The invention is especially helpful in complex marine platforms having numerous cross members, braces and other features that define non-uniformity in the structures.

Briefly, the invention comprises a flood control system for a submersible marine platform having one or more valves attached to a submersible structure below the water level. The valve is attached to the structure by a fluid-tight passageway. The valve is connected to a remote operator by a flexible, low friction remote control cable. The operator is usually attached to the structure above the water level on the work deck.

The cable features a flexible member axially moveable within a flexible casing. The flexibility of the cable enables it to be contoured to avoid obstructions on the structure. Bearings isolate the flexible member from the casing. Isolation of the flexible member from the casing with bearings reduces friction, prevents binding, and allows the flexible member to freely move axially within the casing.

In operation, the operator imparts axial motion to the flexible member of the control cable. A valve actuator is responsive to the axial motion of the flexible member to produce whatever motion is required to open and close the valve. When the valve is opened, water flows into the valve through the passageway and into the structure. This provides the flooding required for proper setting and uprighting of the structure in the water.

The present invention meets problems related to reach rod systems by providing a flexible remote control cable. Unlike reach rods, the cable may be readily contoured to avoid cross members, braces and other like irregularities on the structure. Also, the cable weight per length is substantially less than the rod segments. This feature reduces binding and permits greater depth capabilities.

The present invention also meets problems associated with hydraulically actuated flood systems. Installation of hydraulically actuated flood systems is often time consuming and tedious—often requiring skilled personnel to prepare and test the system. Installation of the present invention is accomplished by attaching the remote control cables to a structure with ties. The valve and operator are coupled to the structure in essentially the same manner as required for either hydraulic or reach rod systems.

The present invention is easier to operte than hydraulically controlled systems because the need for skilled personnel and additional equipment (i.e., hydraulic power unit and valve position indicator) is reduced. The present invention is simply operated by actuating the mechanical operator.

Indication of the valve position of hydraulically actuated flood systems is very difficult without additional mechanical or electrical instrumentation. Conversely, valve position on the present system is directly related to the position of the mechanical operator.

BRIEF DESCRIPTION OF THE DRAWINGS

FIG. 1 is a perspective view of a partially submerged structure.

FIG. 2 is an isolated view of one leg of a submersible marine structure utilizing the present invention.

FIG. 5 is a partially cutaway side view of the valve assembly utilized in one aspect of the invention.

FIG. 6 is a fragmentary frontal view of the valve assembly of FIG. 5.

DESCRIPTION OF THE PREFERRED EMBODIMENT

Figure 4:
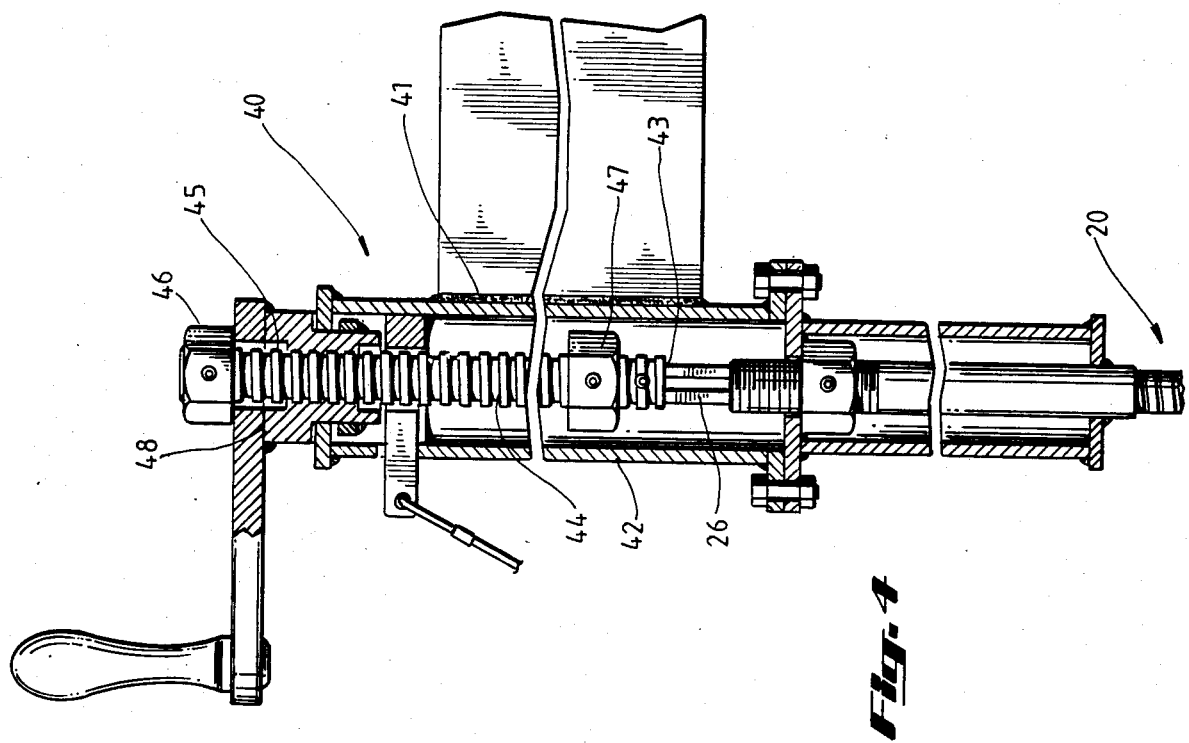
FIG. 4 is a frontal view of the valve operator utilized in one aspect of the invention.

Illustrated in FIG. 1 is a marine platform 10 partially submerged and set into a body of water 12. The term marine platform 10 as used here is defined generically as a structure having a surface structure 14 disposed above the surface 16 of the body of water 12. Attached to the surface structure 14 is at least one hollow, sealed support member, such as leg 15. Support members include legs, braces, skirt sleeves and the like. The legs 15 support the structure 14 above the water 12 and extend into the bottom 17 of the body of water 12. Examples of marine platforms 10 include oil rigs, mining platforms, boat ports and other marine structures that are partially or fully submerged in water.

FIG. 2 depicts a flood control system 18 that is attached to the marine platform 10. The system 18 is used to flood the hollow legs 15 of the structure 10 to provide proper uprighting and setting. The flood control system 18 comprises a flexible control cable assembly 20, an operator 40, and a valve assembly 60.

The valve assembly 60 is attached to the platform 10 below the water line 16. The operator 40 is usually attached to the structure 10 preferably above the water line 16. The flexible remote control cable assembly 20 couples the valve assembly 60 to the operator 40.

FLEXIBLE REMOTE CONTROL CABLE ASSEMBLY, 20

Figure 3:
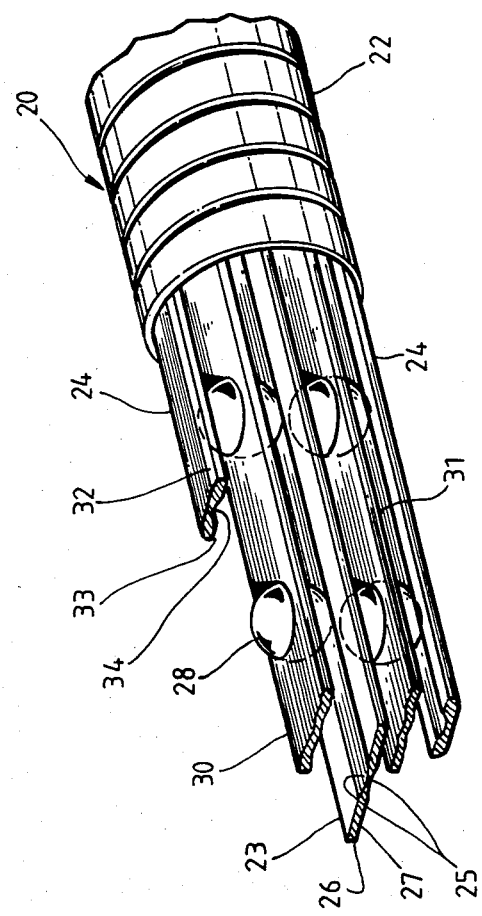
FIG. 3 is a perspective view of the remote control cable assembly utilized in one aspect of the invention.

FIG. 3 illustrates the flexible, remote control cable assembly 20 in its preferred form. The remote control cable assembly 20 includes a flexible casing 22, two outer races 24, a center blade 26, a plurality of balls 28 and two ball guides 30. The center blade 26 travels freely in the axial direction of the cable 20 when longitudinal force is applied to it. The balls 28 and guides 30 provide rolling bearing support to the center blade 26 to minimize frictional forces that oppose movement of the center blade 26.

The casing 22 is essentially cylindrical in shape and preferably crush resistant. The casing 22 is made of a flexible material or is otherwise flexible in configuration. The casing 22 houses the other components of the cable assembly 20.

In the preferred embodiment the outer races 24 are made of flexible blades that define bearing race surfaces. The races 24 are encased within and shaped on one side 32 to conform to the inner contour of the casing 22. On the other side 33 of the race 24, a channel 34 is formed to accommodate and guide the movement of the ball bearings 28.

The center blade 26 is preferbly a flexible stainless steel blade having bearing race surfaces on each side. The center blade 26 is configured and positioned to move axially in the center of the casing and contoured to accommodate the ball bearings 28. The blade 26 accommodates the bearings 28 with inner races 25 formed on each side 23 and 27 of the center blade 26. The center blade 26 is the motion transmitting member of the cable assembly 20. When the operator 40 is engaged the blade 26 translates the motion of the operator 40 to open and close the valve assembly 60.

The balls 28 are rotatably encased and preferably uniformly spaced within the guides 30 to form a bearing set 31. Each cable assembly 20 includes at least two bearing sets 31. The bearing sets 31 are supported between the center blade 26 and one of the outer races 24 where the balls 28 are in rolling contact with an inner race 25 and the channel 34. The ball sets 31 isolate and reduce frictional forces between the center blade 26 and the outer casing 22. As the center blade 26 is pushed in compression or pulled in tension, frictional binding is reduced by the bearing arrangement defined by the bearing set 31. This arrangement allows the center blade 26 to freely move axially within the casing 22.

The materials that comprise the ball guides 30, outer races 24 and centerblade 26 are preferbly both strong and flexible. The flexibility characteristic is advantageous when contouring the cable assembly 20 around braces 19 in the structure 10. The strength characteristic is advantageous when overcoming the force required to open the valve.

OPERATOR, 40

The operator 40 is depicted in FIGS. 2 and 4. The operator 40 is usually attached to the platform 10 at the work deck level 21 by well-known methods including welding 41 and bolting. The operator 40 preferably comprises a housing 42, a threaded rod 44, two stopnuts 46 and 47, and a crank assembly 48.

The threaded rod 44 is enclosed in the housing 42. The rod 44 is coupled at one end 43 to the center blade 26 of the control cable assembly 20. The other end 45 is held in threaded relation with the crank assembly 48. Stop nuts 46 and 47 are threaded onto each end of the rod 44. The nuts 46 and 47 may be adjusted and set to establish stops that control and indicate valve position.

By turning the crank assembly 48, the rod 44 will be raised or lowered. As the rod 44 is raised, the center blade 26 moves axially upward in the casing translating relative motion to open the valve assembly 60. As the rod 44 is lowered, the centerblade 26 moves axially downward in the casing 22 translating relative motion to close the valve assembly 60.

Other suitable operators such as handwheels and the like are also available.

VALVE ASSEMBLY, 60

The preferred valve assembly 60 is depicted in FIGS. 2, 5 and 6. The valve assembly 60 is connected to the leg 15 at a location beneath the water level 16. As depicted in FIG. 6, the valve assembly 60 is attached to the structure by a sealed passageway 62. Preferably, the passageway 62 is constructed by cutting a port 64 into the leg 15 and welding a pipe nipple 66 around the port 64. A flange 68 is coupled to the other end of the pipe nipple 66 to accommodate coupling the valve assembly 60 to the sealed passageway 62.

The valve assembly 60 includes a housing 70. The housing 70 comprises a valve compartment 72 and a cable compartment 74.

The valve compartment 72 comprises a top 76, a bottom 78 and three walls 80, 82 and 84. An inlet 88 is formed in wall 80 of the compartment 72. The inlet 88 provides an opening for the water 12 to flow into the valve 110 for ultimately flooding the leg 15. An outlet 90, not shown, is disposed in wall 82 of the compartment 72. The outlet 90 is preferably aligned with the inlet 88. The outlet 90 provides fluid communication between the passageway 62 and the valve assembly 60. A cable opening 92 is formed in the top 76 of the compartment 72. The opening 92 provides a means of communicating the cable assembly 20 with the valve assembly 60. A shaft bore 94 is formed in wall 84 of the valve compartment 72.

The cable compartment 74 comprises a body 100 and a top 102. The cable compartment 74 is coupled to and disposed on the top 76 of the valve compartment 72 above the opening 92. The cable compartment 74 engages the casing 22 of the cable assembly at 104. The centerblade 26 of the cable assembly 20 extends into the cable compartment 74 past the point of engagement 104.

A wire 106 is attached to the centerblade 26 and is threaded through the opening 92 and into the valve compartment 72.

Enclosed in the valve compartment 72 is a shaft 108, a valve 110 and an actuator 112. The shaft 108 is transversely disposed and rotatably mounted in the compartment 72. The shaft 108 is rotatably held within the compartment 72 by the shaft bore 94 at one end and by a bearing 114 at the other. The valve 110 and actuator 112 are coupled to the shaft 108.

The valve 110 is preferably a ball valve comprising a body 116, a ball 118 disposed within the body 116 and a bore 120 through the ball 118. The ball 118 is coupled to the shaft 108 at 122.

The valve 110 is preferably oriented within the valve compartment 72 where the ball bore 120 is aligned with the housing inlet 88 and outlet 90 when the valve 110 is in the open position. This arrangement allows water to flow through the valve assembly 60 into the passageway 62 to flood the structure 10. When the valve 110 is in the closed position (not shown) the ball 118 seals the housing inlet 88 and outlet 90 preventing the flow of water into the leg 15.

The actuator 112 is coupled to the shaft 108 and to the wire 106. The actuator 112 is disposed in the valve compartment 72 below and aligned with the opening 92.

The actuator 112 preferably comprises a spring-loaded wheel 124 holding the valve 110 in a normally closed position. The wheel 124 includes a cutaway 126 and a groove 128. The groove 128 runs the entire circumference of the wheel 124. The cutaway 126 and groove 128 of the wheel 114 engage the wire 106 that is attached to the centerblade 26. As the centerblade 26 is pulled by the operator 40, the wire 106 translates the relative motion of the centerblade 26 to the actuator 112. The motion of the actuator 112 is directly translated to the shaft 108 to open the valve 110.

A manual override 130 may be attached to the shaft 108 that extends through the shaft bore 94 outside the housing 70. The override 130 provides for means for directly actuating the valve 110 in case of system failure.

A screen 132 may be attached to the valve compartment 72 at the inlet opening 88. The screen 132 prevents debris from entering the valve 110. This feature protects the valve 110 from clogging to ensure the proper operation of the valve 110.

The principles, preferred embodiments, and methods of operation of the present invention have been described in the specification. The invention is not to be construed as limited to the particular forms disclosed because they are regarded as illustrative rather than restrictive. Moreover, variations and changes may be made without departing from the spirit of the invention.

What is claimed is:

1. A flooding system to set a marine platform in a body of water where the platform includes a surface structure disposed above the body of water, at least one support structure attached to and extending below the surface structure to penetrate the bottom of the body of water, each support structure defining a hollow member having at least one port below the waterline whereby closure of the port renders the hollow member sealed, the system comprising:
   a valve assembly coupled to the support structure at the port operable to open and close the port, the valve assembly defining a water flow path between a valve inlet and a valve outlet coupled to the port when the valve assembly is in the open position and sealing the hollow member when in the closed position;
   a remote control assembly coupled to the valve assembly, the remote control assembly comprising an outer flexible casing, a flexible member disposed for axial movement within the flexible casing, and means disposed between the flexible casing and the flexible member for reducing friction between the flexible casing and flexible member; and
   means for imparting axial movement to the flexible member, thereby to operate the valve assembly into the open and closed positions.

2. A system according to claim 1 where the valve assembly further comprises:
   a housing;
   a shaft rotatably mounted in the housing;
   an actuator disposed in the housing, attached to the shaft and coupled with the flexible member to rotate the shaft in response to axial movement of the flexible member; and
   a valve disposed in the housing and operably attached to the shaft to open and close the port.

3. A system according to claim 1 where the means for operating the valve assembly comprises a rotatable screw mechanism for imparting axial motion to the flexible member.

4. A system according to claim 1 where the means for operating the valve assembly comprises a mechanical handwheel.

5. An apparatus according to claim 1 where the flexible member is a blade and where the means for reducing friction comprises:
   two outer ball bearing races enclosed in the casing and extending alongside the flexible blade; and
   two bearing sets, each set having a plurality of balls disposed between the blade and one of the outer races to provide rolling bearing support to the blade.

6. An apparatus for controlling the flooding of a marine platform in order to set the marine platform in a body of water where the platform includes; a surface structure disposed above the body of water, at least one support structure attached to and extending below the surface structure that penetrates the bottom of the body of water, each support structure defining a hollow member having at least one port whereby closure of the port renders the hollow member sealed; the apparatus comprises:
   a valve assembly attached to the support structure and comprising:
      a valve attached to the port and operable to open and close the port; and
      a valve actuator, responsive to linear input movements to operate the valve;
   a valve operator remote from the valve assembly capable of generating linear movements in response to input control signals;
   a flexible cable interconnecting the valve operator with the valve actuator operable to transmit linear movements axially along the cable, the cable comprising:
a flexible casing;
a flexible blade within the casing interconnecting the valve operator and the valve actuator;
a ball bearing race within the casing and extending alongside the blade; and
a plurality of ball bearings disposed between the bearing race and the blade to provide rolling bearing movement for the blade.

* * * * *

UNITED STATES PATENT AND TRADEMARK OFFICE
CERTIFICATE OF CORRECTION

PATENT NO. : 4,696,602
DATED : September 29, 1987
INVENTOR(S) : RICHARD A DAIGLE, ET AL.

It is certified that error appears in the above—identified patent and that said Letters Patent is hereby corrected as shown below:

Column 4, line 22, change "stopnuts" to --stop nuts--.

Column 4, line 33, after "casing" insert --22--.

Signed and Sealed this

Twenty-ninth Day of March, 1988

Attest:

DONALD J. QUIGG

*Attesting Officer*     *Commissioner of Patents and Trademarks*